D. J. Martin,
Tuyere,
N° 53,315.          Patented Mar. 20, 1866.
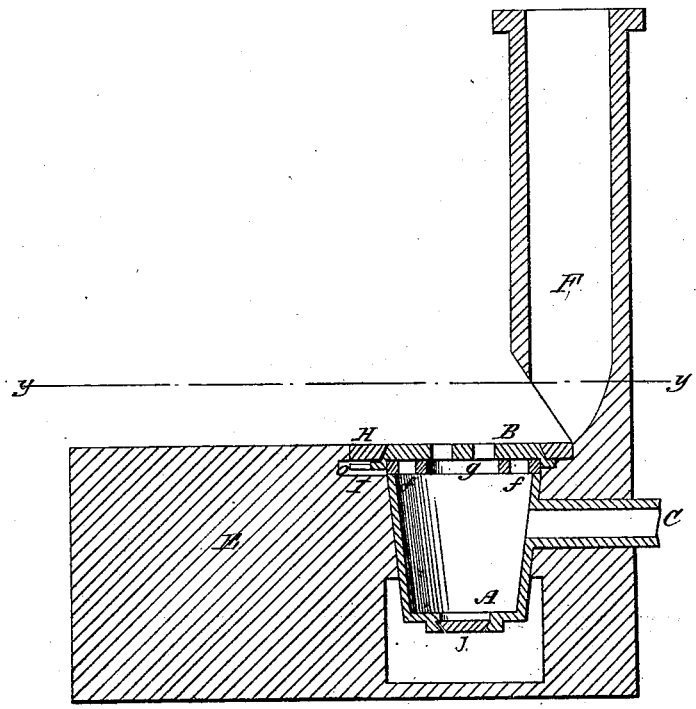
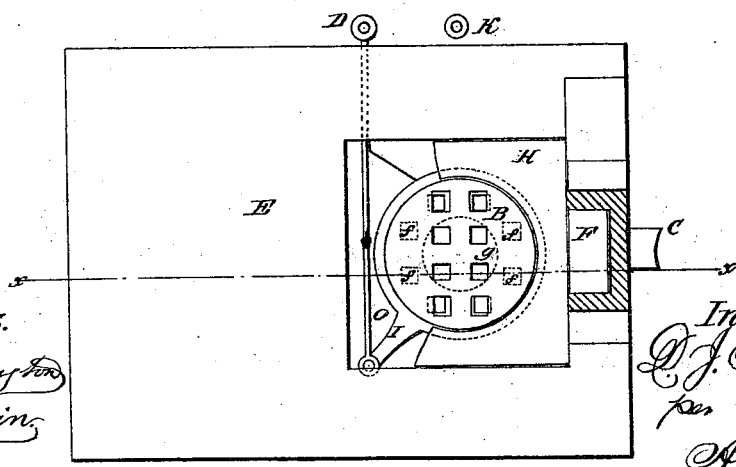
Witnesses.
Inventor.
D. J. Martin
per Munn & Co.
Attorneys.

UNITED STATES PATENT OFFICE.

DAVID J. MARTIN, OF COVINGTON, OHIO.

IMPROVEMENT IN TUYERES.

Specification forming part of Letters Patent No. 53,315, dated March 20, 1866.

*To all whom it may concern:*

Be it known that I, D. J. MARTIN, of Covington, in the county of Miami and State of Ohio, have invented a new and useful Improvement in Tuyeres for Forges; and I do hereby declare that the following is a full, clear, and exact description thereof, which will enable others skilled in the art to make and use the same, reference being had to the accompanying drawings, forming part of this specification, in which—

Figure 1 is an elevation of a vertical section of a forge, to which my improvement is shown applied, the plane of section being seen at $x$, Fig. 2. Fig. 2 is a plan, partly in horizontal section, on the line $y$ of Fig. 1.

This improvement in tuyeres consists in placing an air-chamber below the place of the forge-fire and causing the mouth of the tuyere to terminate therein, the top of the air-chamber being perforated with numerous holes, and said top being surmounted by a rotating perforated disk, which lies beneath the bed of the fire and is rotated by the smith through a lever.

E designates the body of a forge, and F is the chimney. C is the tuyere-pipe entering the back wall of the forge.

The tuyere-pipe is made to enter an air-chamber, A, which is placed over the ash-pit. The bottom of the air-chamber is closed by a slide, J, which is operated by a rod, K, from the working side of the forge. The top of the air-chamber has a perforated cover, the perforations consisting of one large central opening, $g$, which is surrounded by eight smaller openings, $f$, arranged in regular order at equal distances apart. Above the top of the air-chamber is set a disk, B, capable of a partial revolution, as hereinafter described.

The disk B is inclosed around its edge by a frame or plate, H, which covers the space in the forge around the sides of the air-chamber.

The plate H is partly broken away in Fig. 2, to show how the disk B is moved. A space or cavity, O, is formed beneath the front part of frame H in front of the top of the air-chamber, in order to give room for the free movement to and fro of an arm, I, which projects from the edge of disk B.

To the end of the arm I is connected the rod D, which is operated from the working side of the forge, as shown in Fig. 2.

The disk B is perforated with eight holes, arranged in two parallel series of four holes each. The large opening $g$ in the center of the top of the air-chamber admits an uninterrupted current of air through the four center holes of disk B. The eight smaller perforations $f$ allow free currents of air through the outer perforations in the disk—that is to say, through those near the edges of the disk—when the disk is so turned by its rod D as to bring the lines of its perforations either parallel to or at right angles with the tuyere-pipe C.

The top of the air-chamber is so arranged that it shuts off the air from four of the perforations in the disk B when the latter is revolved one-fourth of the way from a right angle to a line parallel with pipe C.

The perforations in the disk are so arranged as to direct the blast from each side to the center of the fire, in order that a small rod of iron may receive the benefit of the whole power of the bellows or blast.

It will be observed that in whatever direction or to whatever position the disk is turned its four center holes are always over the center hole, $g$, in the top of the air-chamber, and the blast can be confined to them or be directed through all its holes, according as the disk is rotated.

I claim as new and desire to secure by Letters Patent—

In forges, the combination of the blast-pipe C, the air-chamber A, with a top perforated as shown, and the perforated rotating disk B, substantially as above described.

DAVID J. MARTIN.

Witnesses:
JOSEPH MARLIN,
RUSH REYNOLDS.